United States Patent
Baker et al.

(10) Patent No.: US 10,277,430 B2
(45) Date of Patent: Apr. 30, 2019

(54) COORDINATED MULTI POINT TRANSMISSION MODES

(71) Applicant: Alcatel Lucent, Boulogne Billancourt (FR)

(72) Inventors: Matthew Baker, Swindon (GB); Fang-Chen Cheng, Murray Hill, NJ (US); Min Zhang, Swindon (GB)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 14/417,754

(22) PCT Filed: Jul. 1, 2013

(86) PCT No.: PCT/EP2013/001916
§ 371 (c)(1),
(2) Date: Jan. 27, 2015

(87) PCT Pub. No.: WO2014/019636
PCT Pub. Date: Feb. 6, 2014

(65) Prior Publication Data
US 2015/0200793 A1    Jul. 16, 2015

(30) Foreign Application Priority Data
Aug. 3, 2012    (EP) .................................... 12360057

(51) Int. Cl.
*H04W 4/00*    (2018.01)
*H04L 25/03*    (2006.01)
(Continued)

(52) U.S. Cl.
CPC ....... *H04L 25/03942* (2013.01); *H04B 7/024* (2013.01); *H04L 5/0035* (2013.01); *H04W 88/02* (2013.01)

(58) Field of Classification Search
USPC ................................. 370/329, 330, 331, 338
See application file for complete search history.

(56) References Cited

U.S. PATENT DOCUMENTS

2005/0165945 A1    7/2005 Lee et al.
2010/0271968 A1    10/2010 Liu et al.
(Continued)

FOREIGN PATENT DOCUMENTS

CN    101938295 A    1/2011
EP    2498417 A2    11/2010
(Continued)

OTHER PUBLICATIONS

English Bibliography for PCT Patent Application Publication No. WO2011055940A2, published May 12, 2011, printed from Thomson Innovation on Sep. 21, 2015, 3 pp.
(Continued)

*Primary Examiner* — Zewdu A Beyen
(74) *Attorney, Agent, or Firm* — Fay Sharpe LLP

(57) ABSTRACT

A method of configuring user equipment in a wireless communication network to operate to receive a dynamically changing coordinated multipoint transmission from one or more transmission point in said network, a computer program product and network control node operable to perform that method. The method comprises: determining, for the user equipment, a set of two or more transmission points from which the user equipment may receive a transmission and allocating them to a coordinated multipoint transmission measurement set associated with the user equipment; allocating a set of modes of operation of the transmission points in the coordinated multipoint transmission measurement set for communication with the user equipment; associating a codepoint to each mode in the allocated set of modes of operation of the set of transmission points to form a codebook; and informing the user equipment of the codebook.

22 Claims, 2 Drawing Sheets

(COMP + DYNAMIC POINT SELECTION)

(51) Int. Cl.
  *H04B 7/024* (2017.01)
  *H04L 5/00* (2006.01)
  *H04W 88/02* (2009.01)

(56) References Cited

U.S. PATENT DOCUMENTS

| | | | |
|---|---|---|---|
| 2011/0075746 A1* | 3/2011 | Rheinschmitt | H04B 7/0615 375/260 |
| 2011/0103324 A1* | 5/2011 | Nam | H04L 5/0048 370/329 |
| 2012/0176884 A1 | 7/2012 | Zhang et al. | |
| 2012/0218968 A1 | 8/2012 | Kim et al. | |
| 2013/0156001 A1 | 6/2013 | Gomadam | |
| 2015/0229451 A1 | 8/2015 | Park et al. | |
| 2015/0256307 A1 | 9/2015 | Nagata et al. | |

FOREIGN PATENT DOCUMENTS

| | | |
|---|---|---|
| JP | 2015-511411 A | 4/2015 |
| RU | 2004125489 A | 1/2006 |
| WO | 2010126711 A1 | 11/2010 |
| WO | WO 2011/055940 A2 | 5/2011 |
| WO | 2011088403 A1 | 7/2011 |
| WO | 2011100676 A1 | 8/2011 |
| WO | 2012094365 A1 | 7/2012 |
| WO | 2012094635 A1 | 7/2012 |
| WO | 2013020520 A1 | 2/2013 |
| WO | 2013066205 A1 | 5/2013 |
| WO | 2013093786 A2 | 6/2013 |
| WO | 2014050350 A1 | 4/2014 |
| WO | 2014054902 A1 | 4/2014 |

OTHER PUBLICATIONS

PCT Pat App. No. PCT/EP2013/001916, Written Opinion of the International Searching Authority, dated Nov. 18, 2013, 6 pp.
European Pat. App. No. 12360057, Extended European Search Report, dated Jan. 28, 2013, 9 pp.
Panasonic, "Required information at the UE in CoMP," 3$^{rd}$ Generation Partnership Project (3GPP), 3GPP TSG RAN WG1 Meeting #57bis, R1-092530, pp. 1-2, XP050351035, Los Angeles, USA, Jun. 29-Jul. 3, 2009.
International Search Report for PCT/EP2013/001916 dated Nov. 18, 2013.
English Bibliography for Russian Patent Application Publication No. RU2004125489A, published Jan. 27, 2006, printed from Thomson Innovation on Aug. 3, 2016, 4 pp.
English Bibliography for Japanese Patent Application Publication No. JP2015511411A, published Apr. 16, 2015, printed from Thomson Innovation on Feb. 19, 2016, 3 pp.
English Bibliography for PCT Patent Application Publication No. WO2014050350A1, published Apr. 3, 2014, printed from Thomson Innovation on Feb. 19, 2016, 4 pp.
English Bibliography for PCT Patent Application Publication No. WO2014054902A1, published Apr. 10, 2014, printed from Thomson Innovation on Feb. 19, 2016, 10 pp.
R1-122143, 3GPP TSG RAN WG1 Meeting #69, ZTE, Downlink control signaling for CoMP, Prague, Czech Republic, May 21-25, 2012, 5 pp.
R1-124251, 3GPP TSG RAN WG1 Meeting #70bis, NTT DOCOMO, Downlink control signaling for Rel-11 CoMP, San Diego, California, USA, Oct. 8-12, 2012, 5 pp.
R1-124408, 3GPP TSG RAN WG1 Meeting #70bis, Alcatel-Lucent, Remaining details of Downlink Control Signalling for CoMP, San Diego, California, USA, Oct. 8-12, 2012, 6 pp.
English Bibliography for Chinese Patent Application Publication No. CN101938295A, dated Jan. 5, 2011, printed from Thomson Innovation on Mar. 3, 2017, 3 pp.
R1-122487, Downlink Control Signalling for MoMP, 3GPP TSG RAN WG1 Meeting #69 Prague, Czech, 21st—25th May 2012, 4 pages.

* cited by examiner

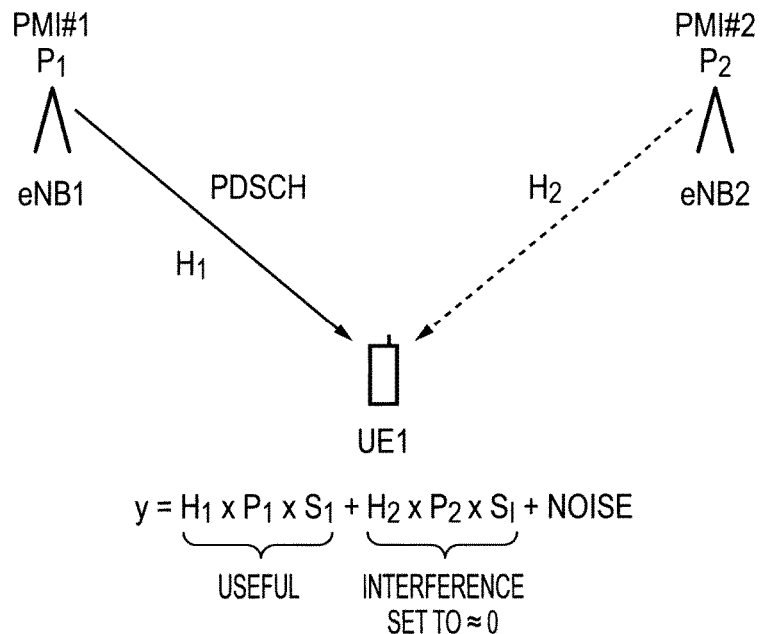
FIG. 1A (COMP + COORDINATED SCHEDULING / COORDINATED BEAMFORMING)
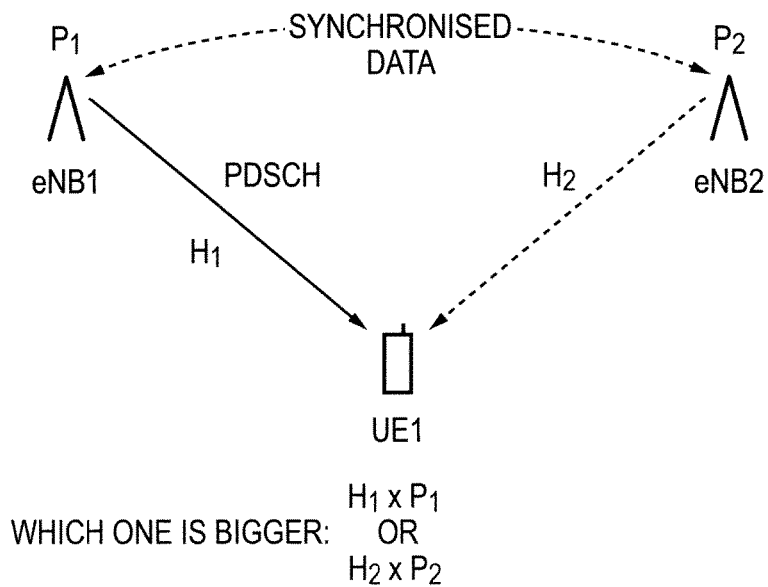
FIG. 1B (COMP + DYNAMIC POINT SELECTION)

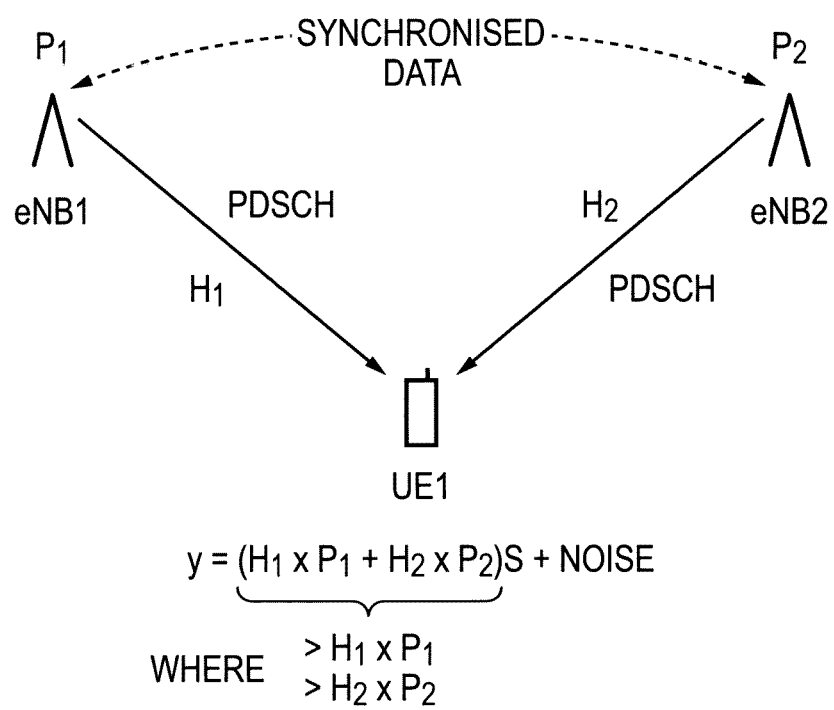
FIG. 1C (COMP + JOINT TRANSMISSION)

COORDINATED MULTI POINT TRANSMISSION MODES

FIELD OF THE INVENTION

The present invention relates to a method of configuring user equipment in a wireless communication network to operate to receive a dynamically changing coordinated multipoint transmission from one or more transmission point in the network, a computer program product and network control node operable to perform that method; a method of interpreting downlink control signalling indicative of a selected mode of operation of transmission points in a coordinated multipoint set associated with user equipment in a wireless communication network, a computer program product and user equipment operable to perform that method.

BACKGROUND

Coordinated multi-point (CoMP) transmission and reception is a tool which may be implemented within a wireless communication network operating according to LTE radio access technology and may offer improvements within a network to data rates, cell-edge throughput, and also overall system throughput. Coordinated multi-point transmission may allow such improvements by functioning to coordinate scheduling, in terms of time and frequency, and beam forming (spatial diversity) across transmission points. Each transmission point may comprise a radio cell or remote radio head. Coordinated multi-point transmission schemes may require dynamic turning on and off of transmission points.

It is desired that a network be able to take advantage of coordinated multipoint transmission techniques.

SUMMARY

Accordingly, a first aspect provides a method of configuring user equipment in a wireless communication network to operate to receive a dynamically changing coordinated multipoint transmission from one or more transmission point in said network, said method comprising: determining, for said user equipment, one or more transmission points from which said user equipment may receive a transmission and allocating them to a coordinated multipoint set associated with said user equipment; allocating a set of modes of operation of said transmission points in said coordinated multipoint set for communication with said user equipment; associating a codepoint to each mode in said allocated set of modes of operation of said set of transmission points to form a codebook; and informing said user equipment of said codebook; wherein each codepoint comprises an indication of a channel state information reference signal associated with each mode of operation of said transmission points in said coordinated multipoint set for communication with said user equipment.

Aspects and embodiments described implement a semi-static configuration of cell reference signal patterns associated with given channel state information reference signal (CSI-RS) resources in a coordinated multipoint set, and allow for signaling which supports dynamic changing of data transmission, for example, PDSCH transmission, from specific transmission point(s) associated with a given CSI-RS resource(s).

According to aspects and embodiments described, each CSI-RS resource is configured by a radio resource control (RRC) signaling to have a user equipment-specific initialization parameter X together, in some embodiments, with an associated Cell ID during coordinated multipoint set configuration.

In one embodiment, each codepoint comprises a two bit code. Accordingly, up to 4 configurations of coordinated multipoint operation can be set by a network control node for a user. Aspects and embodiments may allow signalling overheads to be reduced by exploiting higher layer signalling, for example, RRC signalling, which is not updated frequently, together with reasonable constraints, considered to be necessary by a base station, for example, an eNB. As a result fewer bits may be required to support coordinated multipoint transmissions on a downlink control information (DCI) message. For example, for a cooperative set with three transmission points, aspects described may allow for appropriate signaling to be supported using new 2-bits instead of 3-bits to indicate selected CoMP schemes.

In one embodiment, each codepoint is indicative of a cell reference signal (CRS) pattern associated with each mode of operation of the transmission points in the coordinated multipoint set for communication with the user equipment.

Each codepoint comprises an indication of a channel state information reference signal associated with each mode of operation of the transmission points in the coordinated multipoint set for communication with the user equipment. In one embodiment, a codepoint comprises an indication of a cell reference signal or channel state information reference signal associated with a single transmission point involved in the mode of operation of the transmission points in the coordinated multipoint set for communication with the user equipment. Aspects and embodiments described implement a semi-static configuration of cell reference signal patterns associated with given channel state information reference signal (CSI-RS) resources in a coordinated multipoint set, and allow for signaling which supports dynamic changing of data transmission, for example, PDSCH transmission, from specific transmission point(s) associated with a given CSI-RS resource(s).

According to aspects and embodiments described, each CSI-RS resource is configured by a radio resource controller to have a user equipment-specific initialization parameter X together with an associated Cell ID during coordinated multipoint set configuration.

The transmission point for a data transmission, for example, a PDSCH transmission, is associated with a specific configured CSI-RS resource. According to some embodiments, a cell reference signal pattern transmitted from each transmission point is implicitly derivable from a configured CSI-RS resource. The indication of CRS patterns through physical layer dynamic signalling allows user equipment to conduct rate de-matching for a data channel as coordinated multipoint transmission schemes change to offer optimized overall network operation.

In one embodiment, a codepoint comprises an indication of a combined cell reference signal or combined channel state information reference signal associated with two or more transmission points involved in the mode of operation of the transmission points in the coordinated multipoint set for communication with the user equipment. Accordingly, a single codepoint may allow user equipment to interpret control signalling from a plurality of transmission points thus allowing that control signalling to be "subtracted" from a received signal so that a data transmission can be decoded.

In one embodiment, the allocated set of modes comprises a sub-set of all available modes of operation of the transmission points in the coordinated multipoint set for communication with the user equipment. It will be appreciated that many more configurations of transmission points may be possible than can be encoded within a 2 bit codebook. Accordingly, a network control node may be operable to select, for a given user, based on factors, for example, such as location, transmission point functionality and other similar parameters, an appropriate subset of transmission point configurations.

In one embodiment, the method comprises configuring one or more transmission points in the coordinated multipoint set associated with the user equipment to use an identical cell reference signal. Accordingly, a network may be operable to simplify or align operational characteristics of transmission points such that the codebook can encompass a number of transmission modes without the need for additional code points.

A second aspect provides a computer program product operable, when executed on a computer, to perform the method of the first aspect.

A third aspect provides a network control node operable to configure user equipment in a wireless communication network to operate to receive a dynamically changing coordinated multipoint transmission from one or more transmission point in said network, said network control node comprising: determination logic operable to determine, for said user equipment, one or more transmission points from which said user equipment may receive transmissions and allocate them to a coordinated multipoint set associated with said user equipment; allocation logic operable to allocate a set of modes of operation of said transmission points in said coordinated multipoint set for communication with said user equipment; association logic operable to associate a codepoint to each mode in said allocated set of modes of operation of said set of transmission points, and form a codebook; and communication logic operable to inform said user equipment of said codebook; wherein each codepoint comprises an indication of a channel state information reference signal associated with each mode of operation of said transmission points in said coordinated multipoint set for communication with said user equipment.

In one embodiment, each codepoint comprises a two bit code.

In one embodiment, each codepoint is indicative of a cell reference signal pattern associated with each mode of operation of the transmission points in the coordinated multipoint set for communication with the user equipment.

In one embodiment, a codepoint comprises an indication of a cell reference signal or channel state information reference signal associated with a single transmission point involved in the mode of operation of the transmission points in the coordinated multipoint set for communication with the user equipment.

In one embodiment, a codepoint comprises an indication of a combined cell reference signal or combined channel state information reference signal associated with two or more transmission points involved in the mode of operation of the transmission points in the coordinated multipoint set for communication with the user equipment.

In one embodiment, the allocated set of modes comprises a sub-set of all available modes of operation of the transmission points in the coordinated multipoint set for communication with the user equipment.

In one embodiment, the network node comprises configuration logic operable to configure one or more transmission points in the coordinated multipoint set associated with the user equipment to use an identical cell reference signal.

A fourth aspect provides a method of interpreting downlink control signalling indicative of a selected mode of operation of transmission points in a coordinated multipoint set associated with user equipment in a wireless communication network; said method comprising: receiving a codebook comprising a set of codepoints, each codepoint being associated with a mode of operation of transmission points in said coordinated multipoint set for communication with said user equipment; interpreting a codepoint received in downlink signalling with reference to said codebook; and configuring said user equipment to interpret data transmissions received in accordance with a mode of operation of transmission points in said coordinated multipoint set associated with said codepoint; wherein each codepoint comprises an indication of a channel state information reference signal associated with each mode of operation of said transmission points in said coordinated multipoint set for communication with said user equipment.

Accordingly, user equipment may be operable to perform a method which utilises the codebook configuration set by the method of the first aspect. Downlink signalling, and in particular, downlink control signal messages can be interpreted with reference to the codepoints set by the codebook.

In one embodiment, the downlink control signalling comprises a two bit codepoint.

In one embodiment, the downlink control signalling comprises a dedicated coordinated multipoint transmission point indicator message. Accordingly, new bits may be provided on a downlink control channel to support dedicated CoMP control messaging.

A fifth aspect provides a computer program product operable, when executed on a computer, to perform the method of the fourth aspect.

A sixth aspect provides user equipment operable to interpret downlink control signalling indicative of a selected mode of operation of transmission points in a coordinated multipoint set associated with said user equipment in a wireless communication network; said user equipment comprising: reception logic operable to receive a codebook comprising a set of codepoints, each codepoint being associated with a mode of operation of transmission points in said coordinated multipoint set for communication with said user equipment; interpretation logic operable to interpret a codepoint received in downlink signalling with reference to said codebook; and implementation logic operable to configure said user equipment to interpret data transmissions received in accordance with a mode of operation of transmission points in said coordinated multipoint set associated with said codepoint; wherein each codepoint comprises an indication of a channel state information reference signal associated with each mode of operation of said transmission points in said coordinated multipoint set for communication with said user equipment.

In one embodiment, the downlink control signalling comprises a two bit codepoint.

In one embodiment, the downlink control signalling comprises a dedicated coordinated multipoint transmission point indicator message.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIGS. 1a to 1c illustrate schematically various coordinated multipoint transmission schemes implementable in a wireless communication network.

DESCRIPTION OF THE EMBODIMENTS

In a wireless communication system, user equipment roam through a geographical area covered by the wireless communication system. Base stations, known as eNodeBs in an LTE communications network, are provided which support respective macro cells. A number of such base stations are provided, which are distributed geographically in order to provide a wide area of coverage to user equipment. When user equipment is within a macro cell supported by an eNodeB, communications may be established between user equipment and that eNodeB over an associated radio link.

Each base station typically supports a number of sectors. Typically, a different antenna within each base station supports an associated sector. Accordingly, each base station has multiple antennas and signals sent through the different antennas are electronically weighted to provide a sectorised approach.

A wireless communication system is typically managed by high level radio resource controller. The radio resource controller controls overall operation of the wireless communication system by communicating with the eNodeBs over a backhaul communications link. The controller also communicates with the user equipment via their respective radio links with eNodeBs in order to efficiently manage overall operation of wireless communication system.

Communication between eNodeBs and user equipment within an LTE network occurs on radio resources using orthogonal frequency division multiplexing (OFDM) and MIMO techniques.

Each eNodeB transmits a cell reference signal which acts as a pilot signal and user equipment is operable to use the reference signal for various measurement purposes. In addition, an eNodeB is operable to transmit channel state information reference signals, which allow user equipment to perform channel estimation.

In order to recognise data being transmitted, user equipment must be aware of the cell reference signal and channel state reference signal(s) being transmitted by an eNodeB, so that those signals can be "subtracted" from a received signal, leaving only the relevant data portion intended for given user equipment.

It has been recognised that it is possible to increase data throughput in a wireless communications network by using coordinated multipoint (CoMP) transmission techniques.

Various coordinated multipoint techniques may be implemented within a network and main features of such coordinated transmission techniques are illustrated schematically in FIG. 1a to 1c.

FIG. 1a illustrates schematically a coordinated multipoint technique employing coordinated scheduling or coordinated beamforming. User equipment UE1 is operable to receive a useful transmission S1 on a data channel PDSCH from a first eNodeB, eNB1. That transmission S1 is received by UE1 is seen as a combination of a propagation characteristic H1 multiplied by a precoding index, P1, multiplied by the transmission S1. Similarly, a second eNodeB eNB2 is operable to send transmissions to user equipment operating in a region of radio coverage supported by eNB2, and thus makes transmissions SI using a precoding index P2. UE1 sees that radio signalling as interference.

Coordinated scheduling techniques are such that the operation of eNodeBs, eNB1 and eNB2, are coordinated to optimise overall operation within the network. In this case, the precoding indexes P1 and P2 used by the respective base stations are chosen to try to set the signalling that would usually be seen as interference to a signal which is approximately zero. That is to say, in the illustrated example, H2×P2×SI is selected to approximate zero as seen by UE1.

FIG. 1b illustrates schematically a coordinated multipoint technique employing dynamic point selection. User equipment UE1 is operable to receive a useful transmission S1 on a data channel PDSCH from a first eNodeB, eNB1. That transmission S1 is received by UE1 is seen as a combination of a propagation characteristic H1 multiplied by a precoding index, P1, multiplied by the transmission S1. Similarly, a second eNodeB eNB2 is operable to send a transmission S1 to user equipment UE1 on an appropriate data channel using a precoding index P2. Data to be transmitted is synchronised between base stations eNB1 and eNB2. The user equipment receives data from only one of the transmission points at a time, that transmission point being selected on the basis of which signal is better received at the user equipment at a given point. That is to say, which of H1×P1 or H2×P2 is larger.

FIG. 1c illustrates schematically a coordinated multipoint technique employing joint transmission. User equipment UE1 is operable to receive a useful transmission S on a data channel PDSCH from a first eNodeB, eNB1. That transmission S1 is received by UE1 is seen as a combination of a propagation characteristic H1 multiplied by a precoding index, P1, multiplied by the transmission S. Similarly, a second eNodeB eNB2 is operable to send a transmission S to user equipment UE1 on an appropriate data channel using a precoding index P2. Data to be transmitted is synchronised between base stations eNB1 and eNB2. The user equipment may receives data from both of the transmission points in a given timeslot, provided that receiving a transmission from both transmission points is determined to be greater than receiving from one or other of the transmission points. That is to say, provided (H1×P1+H2×P2) is greater than either of H1×P1 or H2×P2 taken alone.

Overview

Before discussing the embodiments in any more detail, first an overview will be provided.

Dynamic switching between coordinated multipoint (CoMP) downlink transmission schemes, such as Coordinated Scheduling or Coordinated Beamforming (CS/CB) and Dynamic Point Selection (DPS) must be supported in order to maximize benefits associated with fast changes in behavior of MIMO (multiple input, multiple output) channels.

Such dynamic switching typically involves multiple transmission points within a network which may have different Cell IDs and/or a different number of antenna ports. As a result, each transmission point involved in a coordinated multipoint transmission regime may be associated with a different cell reference signal (CRS) pattern. The user equipment must be aware of the cell reference signal of a point from which it is receiving data in order to perform data decoding on a received signal correctly.

Cell reference signal patterns are associated with a Cell ID autonomously detected by user equipment. Channel state information reference signal (CSI-RS) resource associated with each transmission point within a cooperative set is configured by higher layer radio resource control (RRC) signaling within a network. Configured CSI-RS resources in a coordinated multipoint set do not directly indicate to user equipment a CRS pattern associated with each subframe of a data transmission, for example, a PDSCH transmission. As a result, user equipment is not able to rate de-match a data transmission, for example, PDSCH, correctly since it does not necessarily have required information regarding cell reference signal resource element locations if the data, for example, PDSCH, is transmitted from any one or more transmission points in a coordinated multipoint cooperating set.

It will therefore be appreciated that in order to implement efficient coordinated multipoint transmission techniques within a network it is important to be able to indicate cell reference signal resource element locations to user equipment to allow for the user equipment to rate de-match around the cell reference signals correctly.

Aspects and embodiments described implement a semi-static configuration of cell reference signal patterns associated with given channel state information reference signal (CSI-RS) resources in a coordinated multipoint set, and allow for signaling which supports dynamic changing of data transmission, for example, PDSCH transmission, from specific transmission point(s) associated with a given CSI-RS resource(s).

According to aspects and embodiments described, each CSI-RS resource is configured by a radio resource controller to have a user equipment-specific initialization parameter X together with an associated Cell ID during coordinated multipoint set configuration.

The transmission point for a data transmission, for example, a PDSCH transmission, is associated with a specific configured CSI-RS resource. According to some embodiments, a cell reference signal pattern transmitted from each transmission point is implicitly derivable from a configured CSI-RS resource. The indication of CRS patterns through physical layer dynamic signalling allows user equipment to conduct rate de-matching for a data channel as coordinated multipoint transmission schemes change to offer optimized overall network operation.

Aspects and embodiments may allow signalling overheads to be reduced by exploiting higher layer signalling, for example, RRC signalling, which is not updated frequently, together with reasonable constraints, considered to be necessary by a base station, for example, an eNB. As a result fewer bits may be required to support coordinated multipoint transmissions on a downlink control information message. For example, for a cooperative set with three transmission points, aspects described may allow for appropriate signaling to be supported using new 2-bits instead of 3-bits to indicate selected CoMP schemes.

EXAMPLE 1

In some embodiments, the network may be operable to indicate that only a single cell reference pattern needs to be indicated to a user equipment for a given coordinated multipoint set, and it may be intended that user equipment use, for example, the coordinated multipoint transmission schemes: coordinated scheduling/coordinated beamforming and dynamic point selection. According to such an example, dynamic switching between coordinated multipoint transmission schemes is equivalent (in cell reference signal terms) to selection of single transmission point.

An example of possible code points associated with 2-bit in downlink control information messaging configured by RRC signalling is illustrated by Table 1:

TABLE 1

| Code Points of 2 bits | RRC configuration |
| --- | --- |
| (0, 0) | CRS pattern associated with CSI-RS configuration # 1 |
| (0, 1) | CRS pattern associated with CSI-RS configuration # 2 |
| (1, 0) | CRS pattern associated with CSI-RS configuration # 3 |
| (1, 1) | Reserved |

It will be appreciated that the interpretation of code points is defined and updated by RRC signalling semi-statically. The UE is provided with one of the selection of code points by a 2-bit field forming part of a downlink control information message.

It will be appreciated that joint transmission coordinated multipoint transmission schemes may still be supported in the case described above, provided that cell reference signal patterns, or at least frequency shifts of cell reference signal patterns, of transmission points can be aligned within the cooperative set by the network. In such a case the cell reference signal pattern of a transmission point which has the greatest number of antenna ports will be indicated and will be allocated one of first three code points in the code book.

EXAMPLE 2

According to some embodiments, multiple cell reference signal patterns may be indicated to user equipment, as may occur, for example, in joint transmission coordinated multipoint transmissions. In such a case, dynamic switching between coordinated multipoint transmission schemes needs recognize that different combinations of cell reference signal patterns may result from different joint transmission point combinations.

An example of code point allocation in a 2-bit message configured by RRC signalling is given in Table 2:

TABLE 2

| (0, 0) | CRS pattern associated with CSI-RS configuration # 1 |
| --- | --- |
| (0, 1) | CRS pattern associated with CSI-RS configuration # 2 |
| (1, 0) | CRS pattern associated with CSI-RS configuration # 3 |
| (1, 1) | CRS pattern # 1 and CRS pattern 2 and CRS pattern 3 associated with CSI-RS configuration #1~3 respectively |

As in Example 1, the interpretation of code points is defined and updated by RRC signalling semi-statically. User equipment is told a selection of code point in the 2-bit message associated with coordinated multipoint operation and sent to user equipment in a downlink control information message.

In the example set out above, the last code point is configured for 3-point CoMP JT. If that is signaled to user equipment in a downlink control information message, user equipment is operable to rate de-match around the combination of all three cell reference signal patterns.

EXAMPLE 3

According to some embodiments, multiple cell reference signal are indicated to user equipment, as may be required, for example, in a network implementing a joint transmission coordinated multipoint transmission scheme. In such a case, dynamic switching between coordinated multipoint schemes needs to reflect various combinations of cell reference signal patterns.

A possible codebook associated with the code points of a 2-bit CoMP message configured by RRC signalling is given in Table 3:

TABLE 3

| Code Points of 2 bits | RRC configuration |
|---|---|
| (0, 0) | CRS pattern associated with CSI-RS configuration # 1 |
| (0, 1) | CRS pattern associated with CSI-RS configuration # 2 |
| (1, 0) | CRS pattern associated with CSI-RS configuration # 3 |
| (1, 1) | CRS patterns associated with all CSI-RS configurations in the set |

As in Example 2, the last code point is configured for either 2 or 3 point CoMP JT, and the number of transmission points and which transmission points selected for joint transmission assigned to that code point will depend on the configuration of the network in the region of the user equipment and the coordinated multipoint set selected by the network for that user equipment. Thus whilst the last code is indicated to the user equipment, the user equipment is able to operate to rate de-matching around the combination of all cell reference signal patterns given by the configuration of coordinated multipoint set.

EXAMPLE 4

According to some embodiments, multiple cell reference signal patterns are indicated to user equipment, for example, to support joint transmission coordinated multipoint transmission schemes. In such a case, dynamic switching between coordinated multipoint implementation schemes must allow for different combinations of cell reference signal patterns associated with different transmission points.

A possible code point configuration associated with 2-bits configured by RRC signaling to user equipment is given in Table 4:

TABLE 4

| Code Points of 2 bits | RRC configuration |
|---|---|
| (0, 0) | CRS pattern associated with CSI-RS configuration # 1 |
| (0, 1) | CRS pattern associated with CSI-RS configuration # 1 & CRS pattern associated with CSI-RS configuration # 2 |
| (1, 0) | CRS pattern associated with CSI-RS configuration # 1 & CRS pattern associated with CSI-RS configuration # 3 |
| (1, 1) | CRS pattern associated with CSI-RS configuration associated with CSI-RS configuration # 1 and CRS pattern associated with CSI-RS configuration # 2 and CRS pattern associated with CSI-RS configuration # 3 |

In comparison to Example 2 set out above, more code points in the code book have been dedicated to joint transmission coordinated multipoint transmissions.

Aspects and embodiments recognize that without increasing the number of bits required in a downlink control information message, dynamic switching among some preselected or preconfigured coordinated multipoint transmission schemes can be efficiently supported within a network. The configuration of code points interpreted by user equipment may be set on a user equipment by user equipment basis and is preconfigured by RRC signalling semi-statically.

Aspects provide solutions to assist in signaling of transmission point selection to user equipment, thus allowing decoding of data transmissions. The signaling suggested by aspects and embodiments requires a reasonable control overhead, but provides flexibility and enhanced spectral efficiency across a network.

It will be appreciated that allocation of more than 2 bits in a new dedicated CoMP message to be carried as part of downlink control information messaging may allow for increased preconfigured CoMP options to be indicated to user equipment.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s)

to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of configuring user equipment in a wireless communication network to operate to receive a dynamically changing coordinated multipoint transmission from one or more transmission point in said network, said method comprising:
   determining, for said user equipment, a set of one or more transmission points from which said user equipment may receive a transmission and allocating them to a coordinated multipoint set associated with said user equipment;
   allocating a set of modes of operation of said transmission points in said coordinated multipoint set for communication with said user equipment;
   associating a codepoint to each mode in said allocated set of modes of operation of said set of one or more transmission points to form a codebook; and
   informing said user equipment of said codebook;
   wherein each codepoint comprises an indication of a channel state information reference signal associated with each mode of operation of said transmission points in said coordinated multipoint set for communication with said user equipment;
   wherein each codepoint is further indicative of a cell reference signal pattern associated with each mode of operation of the transmission points in the coordinated multipoint set for communication with the user equipment;
   wherein the set of one or more transmission points are configured to encode signals for transmission to the user equipment in accordance with the codebook.

2. A method according to claim 1, wherein each codepoint comprises a two bit code.

3. A method according to claim 1, wherein a codepoint comprises an indication of a channel state information reference signal associated with a single transmission point involved in said mode of operation of said transmission points in said coordinated multipoint set for communication with said user equipment.

4. A method according to claim 1, wherein a codepoint comprises an indication of a combined channel state information reference signal associated with a two or more transmission points involved in said mode of operation of said transmission points in said coordinated multipoint set for communication with said user equipment.

5. A method according to claim 1, wherein said allocated set of modes comprises a sub-set of all available modes of operation of said transmission points in said coordinated multipoint set for communication with said user equipment.

6. A method according to claim 1, wherein said method comprises configuring one or more transmission points in said coordinated multipoint set associated with said user equipment to use an identical cell reference signal.

7. A non-transitory computer-readable medium storing program instructions that, when executed on a computer, cause a computer-controlled network control node to perform the method of claim 1.

8. The method according to claim 1, wherein the determining includes determining, for the user equipment, a set of two or more transmission points from which the user equipment may receive a transmission and allocating them to a coordinated multipoint set associated with the user equipment.

9. A network control node operable to configure user equipment in a wireless communication network to operate to receive a dynamically changing coordinated multipoint transmission from one or more transmission point in said network, said network control node comprising:
   at least one processor and associated memory configured to determine, for said user equipment, a set of one or more transmission points from which said user equipment may receive transmissions and allocate them to a coordinated multipoint set associated with said user equipment;
   wherein the at least one processor and associated memory are configured to allocate a set of modes of operation of said transmission points in said coordinated multipoint set for communication with said user equipment;
   wherein the at least one processor and associated memory are configured to associate a codepoint to each mode in said allocated set of modes of operation of said set of one or more transmission points, and form a codebook; and the network control node further comprising:
   a transmitter configured to inform said user equipment of said codebook;
   wherein each codepoint comprises an indication of a channel state information reference signal associated with each mode of operation of said transmission points in said coordinated multipoint set for communication with said user equipment;
   wherein each codepoint is further indicative of a cell reference signal pattern associated with each mode of operation of the transmission points in the coordinated multipoint set for communication with the user equipment;
   wherein the set of one or more transmission points are configured to encode signals for transmission to the user equipment in accordance with the codebook.

10. The network control node according to claim 9, wherein each codepoint comprises a two bit code.

11. The network control node according to claim 9, wherein the at least one processor and associated memory are configured to determine, for the user equipment, a set of two or more transmission points from which the user equipment may receive a transmission and allocate them to a coordinated multipoint set associated with the user equipment.

12. The network control node according to claim 9, wherein a codepoint comprises an indication of a channel state information reference signal associated with a single transmission point involved in the mode of operation of the transmission points in the coordinated multipoint set for communication with the user equipment.

13. The network control node according to claim 9, wherein a codepoint comprises an indication of a combined channel state information reference signal associated with a two or more transmission points involved in the mode of operation of the transmission points in the coordinated multipoint set for communication with the user equipment.

14. The network control node according to claim 9, wherein the allocated set of modes comprises a sub-set of all available modes of operation of the transmission points in the coordinated multipoint set for communication with the user equipment.

15. The network control node according to claim 9, wherein the at least one processor and associated memory are configured to configure one or more transmission points in the coordinated multipoint set associated with the user equipment to use an identical cell reference signal.

16. A method of interpreting downlink control signalling indicative of a selected mode of operation of transmission points in a coordinated multipoint set associated with user equipment in a wireless communication network, said method comprising:
  receiving a codebook comprising a set of codepoints, wherein each codepoint is associated with a mode of operation of transmission points in said coordinated multipoint set for communication with said user equipment;
  interpreting a codepoint received in downlink signalling with reference to said codebook; and
  configuring said user equipment to interpret data transmissions received in accordance with a mode of operation of transmission points in said coordinated multipoint set associated with said codepoint;
  wherein each codepoint comprises an indication of a channel state information reference signal associated with each mode of operation of said transmission points in said coordinated multipoint set for communication with said user equipment;
  wherein each codepoint is further indicative of a cell reference signal pattern associated with each mode of operation of the transmission points in the coordinated multipoint set for communication with the user equipment;
  wherein the user equipment is configured to decode signals received from the transmission points in accordance with the codebook.

17. A method according to claim 16, wherein said downlink control signalling includes the codebook with the set of codepoints, wherein each codepoint comprises a two bit code.

18. A method according to claim 16, wherein said downlink control signalling comprises a dedicated coordinated multipoint transmission point indicator message.

19. A non-transitory computer-readable medium storing program instructions that, when executed on a computer, cause a computer-controlled user equipment to perform the method of claim 16.

20. User equipment operable to interpret downlink control signalling indicative of a selected mode of operation of transmission points in a coordinated multipoint set associated with said user equipment in a wireless communication network, said user equipment comprising:
  a receiver configured to receive a codebook comprising a set of codepoints, wherein each codepoint is associated with a mode of operation of transmission points in said coordinated multipoint set for communication with said user equipment; and
  at least one processor and associated memory configured to interpret a codepoint received in downlink signalling with reference to said codebook;
  wherein the at least one processor and associated memory are configured to configure said user equipment to interpret data transmissions received in accordance with a mode of operation of transmission points in said coordinated multipoint set associated with said codepoint;
  wherein each codepoint comprises an indication of a channel state information reference signal associated with each mode of operation of said transmission points in said coordinated multipoint set for communication with said user equipment;
  wherein each codepoint is further indicative of a cell reference signal pattern associated with each mode of operation of the transmission points in the coordinated multipoint set for communication with the user equipment;
  wherein the user equipment is configured to decode signals received from the transmission points in accordance with the codebook.

21. The user equipment according to claim 20, wherein the downlink control signalling includes the codebook with the set of codepoints, wherein each codepoint comprises a two bit code.

22. The user equipment according to claim 20, wherein the downlink control signalling comprises a dedicated coordinated multipoint transmission point indicator message.

* * * * *